June 22, 1943. H. O. SCHJOLIN 2,322,479
TORQUE CONVERTER-INTERLOCKING CONTROL, AUTOMATIC
Filed Sept. 1, 1938 6 Sheets-Sheet 4

Inventor
Hans O. Schjolin
By Blackmore, Spencer & Flint
Attorneys

Patented June 22, 1943

2,322,479

UNITED STATES PATENT OFFICE 2,322,479

TORQUE CONVERTER INTERLOCKING CONTROL, AUTOMATIC

Hans O. Schjolin, Pontiac, Mich., assignor, by mesne assignments, to Yellow Truck & Coach Manufacturing Company, Pontiac, Mich., a corporation of Maine Application September 1, 1938, Serial No. 227,926

35 Claims. (Cl. 192—.01)

The invention relates to motor vehicles, more particularly of the type in which specialized grouping of the driving mechanism and of the controls is required for the operation of large vehicles such as busses or trucks, wherein the driver's station may be located at some distance from the power plant.

The invention relates specifically to the automatic controls for the driving mechanism whereby the driver, by manipulation of a single control member, may compel continuously the selection of drive at the highest speed ratio or in reduction ratios.

The invention relates also to auxiliary control devices whereby the driver may interrupt the automatic functioning of the controls at any time and compel operation manually.

The invention relates likewise to a control system in which the necessary force for performing the control actuation is furnished by auxiliary power means such as fluid pressure motors supplied from a reservoir or its equivalent, and relates to quickly responsive relays which enable the control mechanism to function surely and rapidly.

The invention also relates to a system of controls for relays involving electro-pneumatic means interlocked through a switch system which provides for the relief of torque momentarily in the operation of positively driving clutches used for establishing and releasing drive for certain shift actions of the driving mechanism.

An outstanding advantage of the invention is the method for compelling, by overtravel of the driver's accelerator pedal, an immediate downshift from the highest ratio to the lower ratios upon full depression of the pedal.

An object of the invention is to provide a single driver-operated control member for compelling continuous selection of drive at high or reduction speed ratios in the mechanism described above. A further object is the provision of automatically selected speed ratios therein, wherein auxiliary control devices enable the driver to interrupt automatic selection at any time, and compel manually selected operation. An additional object is to provide auxiliary power means controlled by relays for carrying out the automatic and manual control functions described. It is likewise an object to provide a control system having means for the relief of torque momentarily during the shifting of positively driving clutches used for establishing the various ratios herein. It is an important object to provide a ratio shift compelling means controlled by movement of the engine accelerator pedal for immediate downshift from the highest to the lower ratios upon full depression of said pedal.

In the demonstration herewith the invention shown is applied to a form of drive in which a hydraulic torque converter yields infinitely variable speed ratios for torque multiplication and direct positive drive between the engine and the output shaft for the highest ratio without the intermediary of a friction clutch or its equivalent. The disclosure herewith also shows control means arranged in an interlocking system between the elements for selecting ratio automatically and the elements for establishing the relief of torque for synchronizing and changing speed ratio, so that the system is protected against wrong motion.

Additional advantages appear in the present application wherein the operating requirement for coordination of foot and hand controls normally utilized is supplied by the automatic control means, which includes the auxiliary power devices as noted preceding. Further objects and advantages are described by the following detailed specification given to accompany the drawings where:

Figure 1:
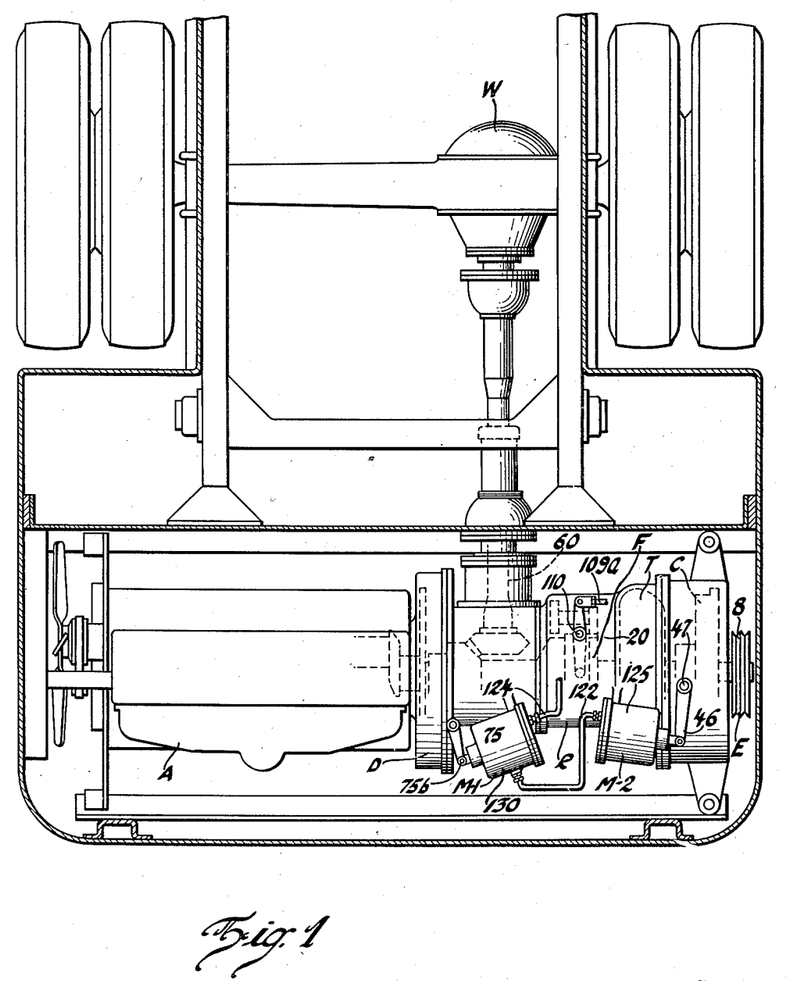
Figure 1 is a schematic view of the installation of the driving mechanism controlled by my invention, applied at the rear of a motor bus chassis, the power plant being arranged transversely.

In Figure 1, the driving mechanism installed in the rear of a passenger bus is arranged transversely, the engine at the left, the driving mechanism at the right, and the final output drive shaft being in the fore-and-aft plane of the vehicle connected to conventional differential drive for the vehicle rear wheels.

The engine is of conventional type, and its power is delivered to the output shaft directly through positive drive clutch D or indirectly through turbine clutch C and a turbine type torque converter T acting as an infinitely variable transmission for reduction speed ratio drive, a gear assembly R in which is incorporated an overrunning clutch F arranged coaxially with respect to the engine shaft.

The propeller shaft 60 extends forwardly and down to drive the conventional differential gear shown in outline in Figure 1 at W. The engine is conventionally indicated at A in Figure 1; the clutch operator mechanism being designated by letters M—1 and M—2, described fully further on in this specification.

Figure 2:
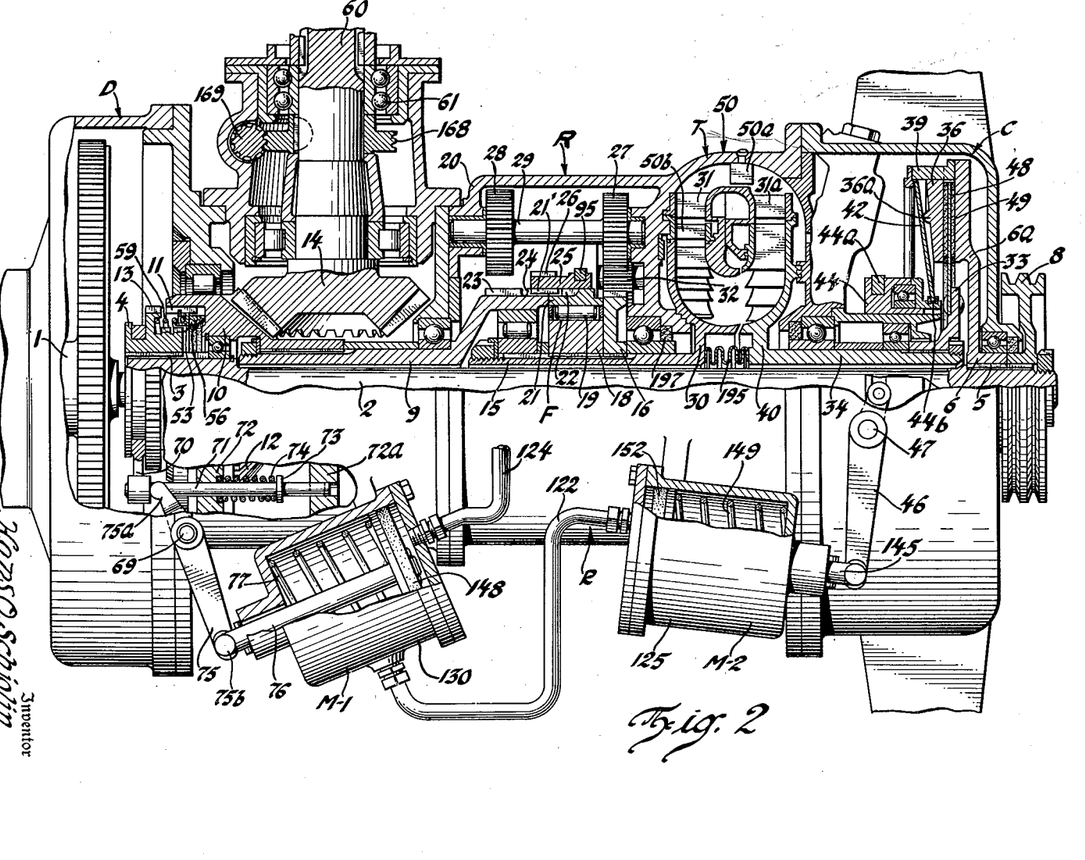
Figure 2 is a longitudinal view of the power plant of Figure 1 taken in part section in the longitudinal plane.

The transmission control elements of Figure 1 are shown in detail in Figure 2. The engine crankshaft 1 drives the engine flywheel in the customary manner and likewise solid shaft 2, which extends through the entire length of the gear box 20, mounted in appropriate bearings. Adjacent the engine shaft 1 is spline 3 of shaft 2 upon which slider 4 is mounted. At the right end of Figure 2 shaft 2 is shown splined at 5 to clutch hub 6, and to flange fitting 8 which drives the accessory units including the air compressor of the vehicle.

Sleeve 9 is mounted for rotation and surrounds shaft 2 for part of its length, being splined to bevel gear body 10 having teeth 12 meshing with the teeth of bevel gear 14 attached to or integral with propeller shaft 60.

Slider 4 may be moved by yoke 70 from rocking of shaft 69 through lever 75 outside the casing 20, and its teeth 13 may mesh with integral teeth 11 of gear body 10 rotating the shaft 9. Cut on the body of slider 4 are two rings of teeth 54 and 55, shown in detail in Figure 9, teeth 54 engaging balking ring 53 loosely, so that the ring may have limited lost motion rotationally through its teeth 53a. The ring 53 extends in a radial flange having frictional bearing with a face of collar 56 splined to the inner portions of teeth 11. Spring 59 exerts constant tension between that portion of the slider which carries teeth 13 and balk ring 53, so that there is always constant loading of the faces of ring 53 and collar 56.

Figure 8:
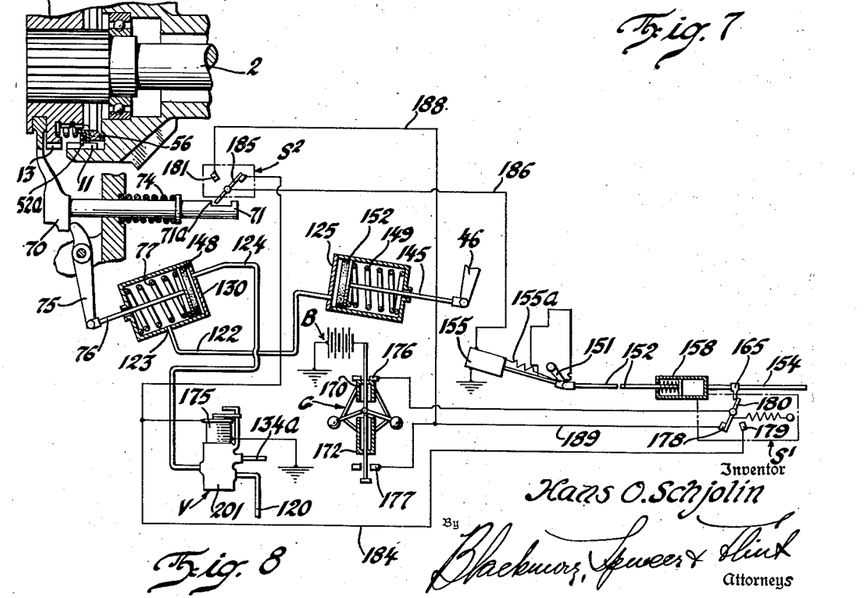
Figure 8 illustrates the relative positions of the control elements during the interval when the operator is overruling the governor and compelling downshift from direct to the reduction ratios.

Lock ring 52a of Figure 8 prevents the backing off of ring 53, restraining it to move longitudinally in the space between it and the collar 56.

When the yoke 70 is moved to apply an engaging force to slider 4 for the teeth 13 to mesh with the teeth 11, frictional drag collar 56 bearing on ring 53 applies a rotational component to the ring so that the facing portions of teeth 53a of the ring block the longitudinal motion of the slider at teeth 55, whenever there is differential rotation between the shafts 2 and 9. When synchronism is achieved, the balking action ceases and the teeth 53 may pass through teeth 55, permitting teeth 13 to enter teeth 11 to complete direct drive locking engagement between shafts 2 and 9.

The clutch operating and actuating system of Figure 2 consists primarily of two servo cylinders 130 and 125 fed with air pressure from pipe 124. Porting in cylinder 130 connects to pipe 122 which feeds cylinder 125 as is explained in detail later.

Clutch D has fork 70 fixed to rod 71 mounted to slide longitudinally in extensions 72 of casing 20, the stop 73 and spring 74 normally acting to load the slider 4 for rightward or engaging movement. Lever 75 pivoted to the casing 20 at 69 may normally rock to remove the force of spring 74 and separate the teeth 13 from teeth 11 of the direct drive clutch D, under the motion of pivoted piston rod 76 and piston 148 through the superior force of springs 77 in cylinder 130. Admission of air pressure from pipe 124 to the face of piston 148 overcomes the force of springs 77 and permits spring 74 to load slider 4 for engaging direct drive, which, as has been stated, occurs at synchronism with full mesh of teeth 13—11.

The second cylinder 125 houses piston 152, springs 149, and rod 145, pivoted to lever 46 of shaft 47 arranged to shift fork 44a and bearing sleeve 44 of clutch C.

Clutch C has hub 6, flange 6a, extension 39, and slidable presser plate 36, the disc spring 42 being guided in a groove 44b of bearing sleeve 44, its outer edge being held by a lip of extension 39. The presser plate 36 has fulcrum portion 36a which bears against spring 42, so that servo pressure in cylinder 125 will unload the spring 42 from plate 36, and clutch driven disc 48 will cease to be gripped between plate 36 and flange 6a. When air pressure is removed from cylinder 125, spring 149 shifts piston 152 and rod 145 to the left, rocking lever 46 clockwise, and shifting sleeve 44 to the right, as in Figure 2, and disc 42 past center to loading position as shown in the figure, wherein plate 36 grips clutch driven plate 48 to rotate with flange 6a and shaft 2. Fork 44a shifts sleeve 44 when shaft 47 rocks.

As will be explained further, the air pressure is furnished to pipe 124 from a single control valve V operated by a vehicle speed governor G described in connection with Figures 4 and following.

When air is supplied to both cylinders, the direct drive clutch D is permitted to be engaged, and the turbine clutch C is unloaded. When air is withdrawn, the direct drive clutch D is disengaged, and the turbine clutch C engaged. The sequential control action by which the transitions between direct and turbine drives are accomplished are an important part of the invention, as will be understood from the following description.

The turbine unit primary member is vaned impeller 40 attached to sleeve 34 which may be driven by driven clutch plate 48 from shaft 2 at engine speed. Turbine vaned rotor 30 receives the torque delivered by the unit, transmitting it through attached sleeve 15 to splined gear 16 meshing with countershaft gear 27 through reverse idler 32, and through affixed roller clutch member 18, one-way locking rollers 19 and external clutch member 21. The reaction-bladed member 50 of the turbine affords multiplication of torque in the customary manner in such devices, by virtue of the relationship of its blading with respect to the vanes of the impeller 40 and the rotor 30. Blades 50a and 50b are part of reaction member 50. Blades 31 and 31a rotate with the output rotor 30 as is customary in such constructions. Seals 195 and 197 only are required to prevent loss of liquid from the turbine compartment.

Hollow shaft 9 is splined to gearbody 10 which drives output shaft 60, and carries ring of teeth 23 longitudinally aligned with gear 28 of countershaft 29 to which gear 27 is affixed. Slider 25 moved by fork 95 has external ring of teeth 26 meshable with 28, and internal teeth 21' meshable with 23, in which position reverse rotation is imparted from rotor 30 and shaft 15 through train 16—32—27—28—26—25—21'—23 to shaft 9.

When the slider 25 is in neutral, no engagement of gears 28—23 through slider 25 is possible.

In right-hand position in Figure 2, slider teeth 21' mesh with teeth 22 cut on the outer surface of roller clutch race 21, so that rotation of rotor 30 is imparted through shaft 15 to member 18, and through rollers 19 to race 21, and to slider 25.

A second ring of teeth 24 on sleeve 9 adjacent teeth 23 is meshed with teeth 21' of slider 25, so that with the engine driving, the torque of rotor 30 is delivered from slider 25 through teeth 21' and 24 to shafts 9 and 60. When the engine is decelerated, the vehicle may coast and rotor 30 may idle. Should clutch C be disconnected, the turbine impeller 40 and rotor 30 both come to rest, because of freewheel clutch F.

Figures 9, 10:
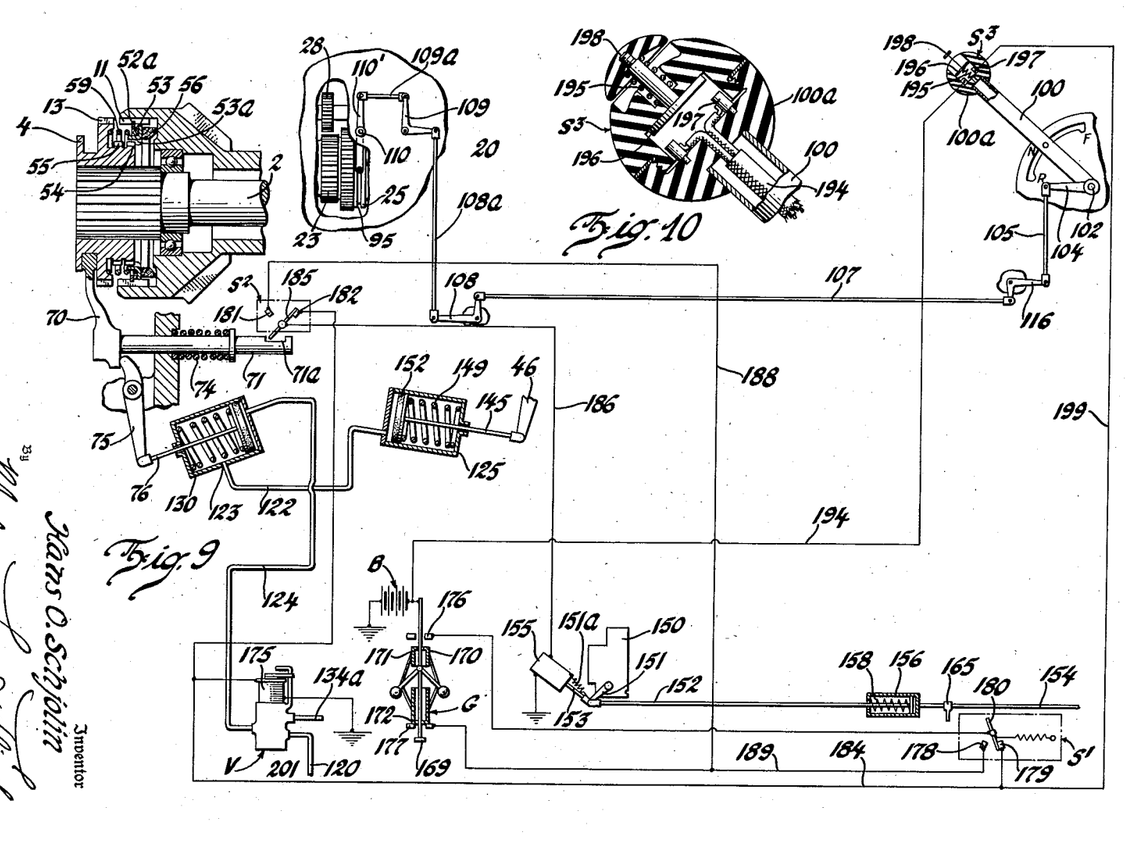
Figure 9 is a control diagram similar to that of Figure 4 but including the operator's forward-neutral-reverse compelling mechanism wherein a master control associated with the handlever may interrupt the electrical circuits involved in the automatic shift and automatic synchronization controls.
Figure 10 shows the detail of construction in section of the gear-lever ball of Figure 9.

Fork 95 is manipulated by shaft 110 of Figure 9 to which it is affixed; by lever 110' outside the casing 20, and rod 109a, bellcrank 109, rod 108a, bellcrank 108, and rod 107. The remainder of the manual control connections of Figure 9 include the operator's shifter lever 100, linked with rod 107 through proper connections such as lever 104 moved with lever 100, link rod 105 and bellcrank 116.

Figures 3, 4:
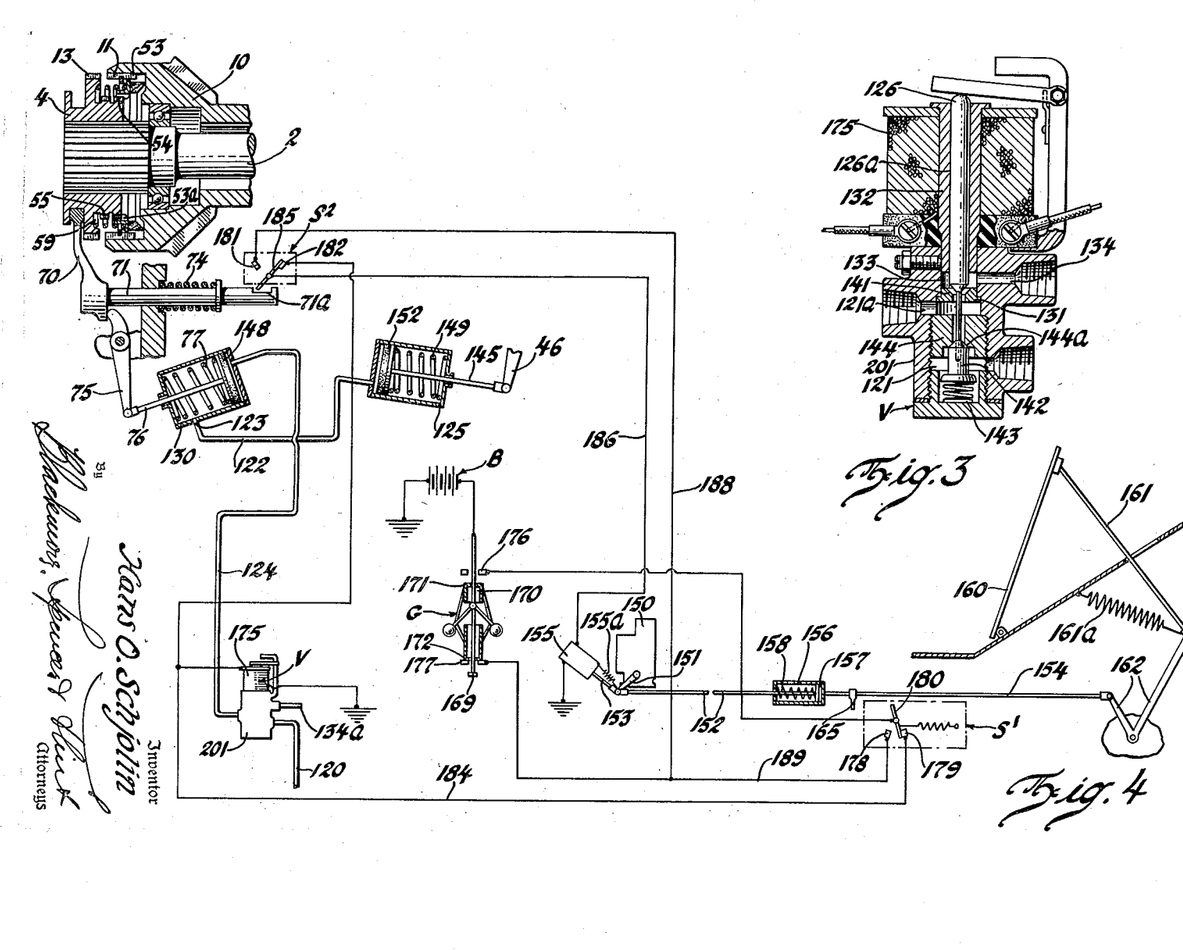
Figure 3 is a vertical section of the electro-magnetically operated control valve designated by the letter V in the following description.
Figure 4 is a diagram of the electric circuits and control elements for the automatic shift and synchronization control as applied to the construction of Figure 2.

Figures 3 and 4 show the master controlling valve for the clutch servo system of Figure 2, connected through pipe 120 to a reservoir of air pressure (not shown), supplied by the conventional automatic pump, common in buses and trucks of the present day. The outlet pipe 124 from valve V feeds both cylinders 125 and 130 of Figure 2, as is described further in detail. The exhaust connection to atmosphere is shown at 134a.

The assembly of valve V comprises a casing 201 enclosing sliding valve stem member 126 in bore 126a drilled out centrally in sleeve 132, and cross ported at 133 to register with exhaust port 134 leading to pipe 134a; an air valve 142 is arranged to seat in plate 144 at 144a, to seal off passage of air pressure chamber 121 connected to inlet pipe 120.

Cylindrical ring 131 embodying seat 141 is set in the casing 201 and separates the servo outlet chamber 121a from the exhaust space about the upper portion of 126 above seat 141.

The stem of valve 126 projects upward into recess of solenoid coil 175, acting as an armature for moving the valve when current is furnished to the coil 175 from external circuits to be described.

Spring 143 rests under the air valve 142 tending to hold it firm on seat of plate 144, sealing off chamber 121 from 121a.

When current is applied to coil 175, the armature portion 126 is drawn down by the flux field generated, shifting the valve V against the tension of spring 143. This causes the valve action between 126—141 to seal at seat 141, preventing atmospheric leakage to port 134, and the lower valve 142 becomes unseated by servo line pressure, admitting compressed air from line 120 and chamber 121 to space 121a and pipe 124.

While current is flowing in the circuit of coil 175, as will be described, the air reservoir is constantly connected to servo feed pipe 124 and thereby to cylinders 125 and 130.

When the current circuit is broken, the spring 143 is allowed to shift 126 and 142 upward, sealing off the compressed air supply from the servo cylinders 125 and 130, and connecting them to exhaust. Member 142 abuts the lower end of stem 46 during this action.

Figure 4 shows a conventional engine carburetor 150, the throttle valve of which is moved by lever 151 pivoted to rod 152, and solenoid armature rod 153. Solenoid 155 is mounted conveniently on the engine. Lost motion connection is established between the accelerator rod 154 and rod 152 through cylinder 156, disc 157 attached to rod 152, and spring 158, the operator's accelerator pedal 160 and rod 161 being connected through bell-crank 162 to rod 154. The motion of rod 154 is also imparted to stop 165 fixed to rod 154 for purposes which will be stated later.

Governor G is of conventional type, receiving drive from shaft 60 of Figure 2 through appropriate gearing 168 of Figure 2 to shaft 169, the sliding collar 170 carrying contact 171, and contact 172.

Control valve V is mounted at any convenient point on casing 20 and consists of a construction as shown in Figure 3, operated by solenoid coil 175 and armature 126.

Cylinders 125 and 130 are shown in detail in Figure 2, the piston rods 145 and 76 controlling the actuation of the clutches C and D as described.

In the diagram of Figure 4, shaft 2 is driven by the engine as shown in Figure 2, and carries splined jaw clutch slider member 4, the teeth 13 being meshable with the teeth 11 of gearbody 10 which drives gear 14 and shaft 60 as shown in Figure 2. Fork 70 attached to shaft 71 may shift member 4 to engage and disengage the teeth 13—11. Spring 74 normally biases shaft 71 to load slider 4 of clutch D for engagement with the teeth 11 of gearbody 10. Lever 75 is adapted to shift slider 4 out of engagement by the force of springs 77 of cylinder 130 tending to shift piston 148 and rod 76 to the right, but when air pressure is admitted behind the piston 148, from pipe 124, the load of spring 77 is overcome, and spring 74 is then permitted load slider 4 for engagement of teeth 13 and 11.

Port 123 located at a distance along the barrel of cylinder 130 received no air pressure from line 124 and valve V until the piston 148 is moved to uncover it, at which time the direct drive clutch D is fully loaded by springs 74.

The air reservoir of the vehicle is connected through pipe 120 to pressure space 121 of casing 201 of valve V. The outlet port 121a of valve V is connected to pipe 124 joined to cylinder 130.

The clutch C is operated as described in connection with Figure 2 by piston 152 and rod 145 in cylinder 125, housing spring 149.

The electric interlocking circuit is composed of battery B shown in the diagram connected to governor collar 170, which may contact points 176 or 177, through 171 or 172. Switch point 179 of switch S¹ may deliver battery current from 176 to the solenoid 175 of valve V, the other connection of the solenoid being grounded on the frame of the vehicle so that a circuit may be completed back to the opposite pole of the battery. Point 177 also delivers current to point 181 of switch S².

The upper governor contact 176 is connected to armature 180 of switch S¹. Point 179 of switch S¹ connects to solenoid 175. Point 182 of switch S² is joined to the first circuit described through connection 184 so that it may break current also used to operate solenoid 175.

The armature 185 of switch S², which is rocked by intersecting slot 71a of shaft 71 is connected to throttle control solenoid 155, which in turn is grounded on the frame of the vehicle. Armature rod 153 of the solenoid is restored by spring 155a when the current in 155 is cut off.

Figures 5, 6:
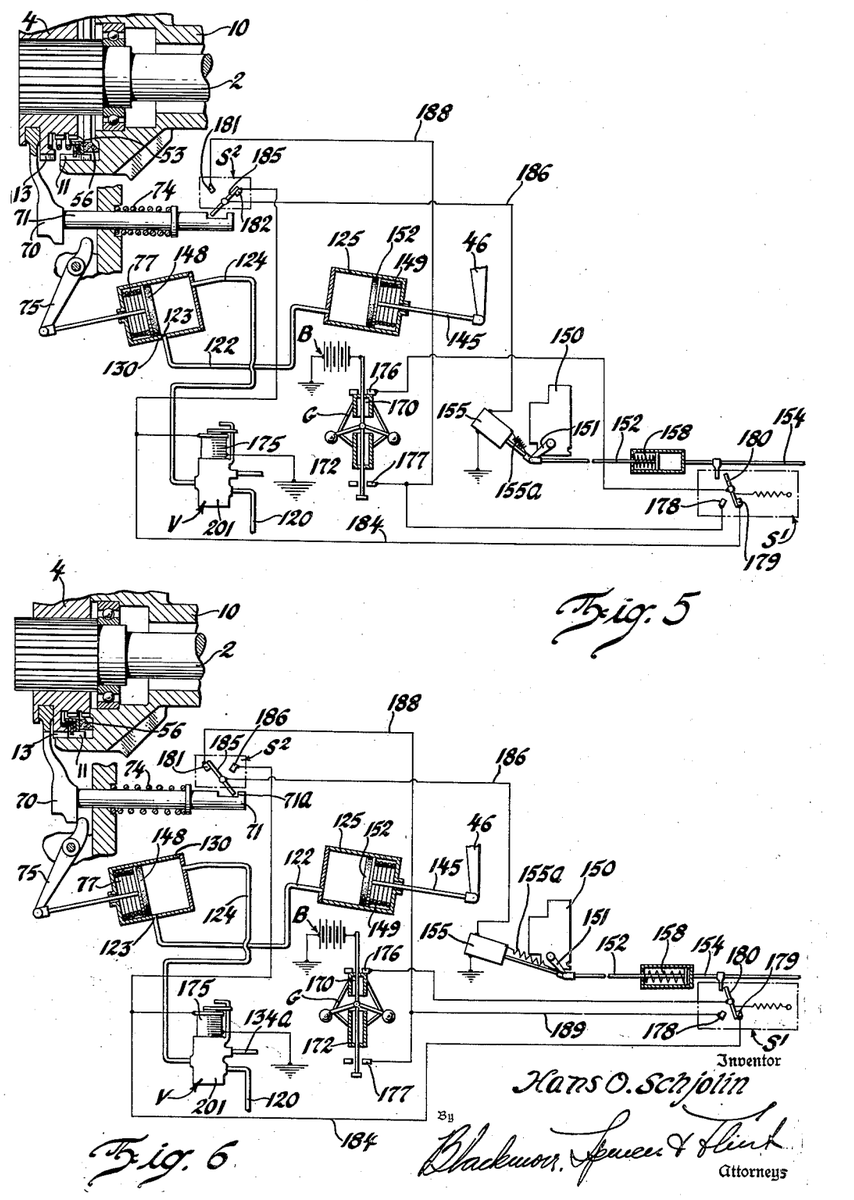
Figure 5 is a repetition of elements of Figure 4 showing the relative positioning of the control elements thereof during the interval of shifting from drive through the converter to direct drive.
Figure 6 is a view similar to that of Figure 5 showing the control elements as positioned for direct drive.

The drawing of Figure 5 shows the relative positions of the controls when shifting from the drive of the torque converter to direct drive, at which time the balking action of member 53 of clutch D of Figure 2 is being exerted. The governor G is connecting the battery circuit contact 176 to armature 180 of switch S¹, the battery current to point 179 and to the solenoid 175 of valve V. This admits fluid pressure to line 124 and cylinder 130, causing piston 148 to move to the left of the figure and rock lever 75 against the action of springs 77. During this interval spring 74 is endeavoring to load clutch D for engagement. Battery current through connection 184 is being delivered also to point 182 of switch S² and through the armature 185 and connection 186 to throttle controlled solenoid 155 so that the engine throttle is reduced to idling position in order to assist in the synchronization action of clutch D.

As soon as synchronization is completed, and the teeth 13—11 are seated, shaft 71 moves to rock armature 185 of switch S² anticlockwise, disconnecting the battery current from throttle controlled solenoid 155, which action restores full control of the engine throttle to the car driver, through pedal 160.

In Figure 6 the system is shown at the point when the armature 185 and contact 181 had just been connected for establishing direct drive.

In Figure 6 the governor is shown in the same position as in Figure 5, but the switch S² has been tripped by shaft 71 so that the carburetor throttle arm 151 is no longer restrained by the solenoid 155, and spring 158 of the lost motion connection has restored the normal position of rod 152 with respect to rod 154. Throttle return spring 155a is weaker than the lost motion spring 158.

Figure 7:
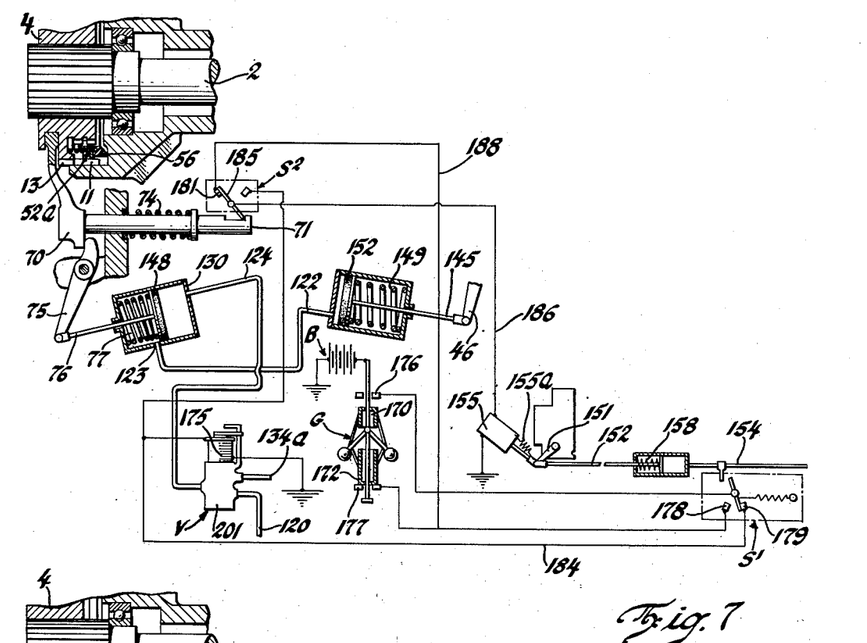
Figure 7 shows the control elements as they are positioned for the shifting down interval from direct, to drive through the torque converter.

In Figure 7 the arrangement of parts is for the purpose of illustrating the normal operating conditions of the control elements when the governor is causing shifting down from direct drive through clutch D of Figure 2 to torque converter drive through clutch C of Figure 2. In this view, the governor G has disconnected from contact 176, and has connected contact 177 so that the battery current may flow to the point 181 of switch S², and to point 178 of switch S¹. The battery current is relieved from solenoid 175 of valve V, permitting the air pressure to exhaust from the face of piston 148 of cylinder 130 through the exhaust port 134 of valve V, and likewise to exhaust from the face of piston 152 through connecting pipe 122 and port 123 through the atmospheric connection about the rod 76 of piston 148 in cylinder 130.

During the period of shift from clutch C to clutch D, when the synchronism dwell is necessary to obtain proper operation of clutch D, it is useful to maintain clutch C in driving engagement until the jaws of clutch D are nearly at synchronous speed. To accomplish this, pipe 122 must receive its pressure from valve V and line 124 through port 123 located along the barrel of cylinder 130, some distance from the full stroke position of piston 148. The incoming air pressure then has to shift 148, rod 76 and lever 75 to a position where the force of spring 77 is taken away, and lever 75 permits spring 74 to shift rod 71 to the right, assuring loading of clutch D before clutch C is unloaded, and putting a timing delay in the release of clutch C. On the other hand, during engagement of clutch C it is desirable to accelerate the release of air pressure from cylinder 125 so that clutch C may come in reasonably quickly; therefore, the porting of air release from 125 through 122 and 123 to the atmospheric side of piston 148 enables this to be accomplished.

When the governor has moved to the position shown in Figure 7, it is for the purpose of disconnecting clutch D, therefore with the removal of air pressure from the face of piston 148, springs 77 of cylinder 130 will exert a thrust on piston 148 to the right, rocking lever 75 so as to stress rod 71 for leftward motion, against the action of spring 74. The resultant of this action is to endeavor to disconnect the jaw clutch teeth 13—11. Since torque on the flat sides of the jaw clutch teeth may interfere with the separation of teeth 13—11 and release of drive, the governor circuit through switch S² is established through connection 188, point 181, armature 185, and connection 186 to solenoid 155 for reducing the engine throttle to idling position momentarily, or sufficiently long to relieve the engine torque from the teeth 13—11.

Immediately upon the accomplishing of the release motion, slot 71a of rod 71 will snap the armature 185 of switch S² so as to disconnect the solenoid 155 and thereby restore control of the engine throttle to the operator's pedal 160.

Figure 8 is to illustrate the action of the control elements whereby the driver, by moving the engine throttle pedal 160 past full throttle position, may cause the automatic downshift from direct drive to converter drive to take place.

Accelerator connected rod 154 has attached stop 165 which in ordinary throttle operating ranges will not interfere with the action of armature 180 of switch S¹. However, at beyond full throttle the stop 165 will strike the armature 180, disconnecting the circuits beyond point 179, and connecting point 178 of switch S¹ through connection 189 to point 181 of switch S².

In breaking the connection at point 179, the current which has been flowing through solenoid 175 of valve V is interrupted and the valve spring 143 causes the fluid pressure in pipes 124 and 122 to exhaust by shifting the valve members 126—142 of Figure 3 to exhaust position.

It will be seen that here again springs 77 of cylinder 130 will force piston 148 to the right, causing lever 75 to rock counterclockwise in order to accomplish disengagement of clutch D. As before, solenoid 155 operating throttle control lever 151 is momentarily energized to remove the engine torque load from teeth 13—11, as described in connection with Figure 2.

In Figure 9 the operator's control for forward-neutral-and-reverse shift is shown in the upper right corner wherein lever 100 pivoted at 102 to the dash of the driver's compartment may rock lever 104 pivoted to rod 105, in turn pivoted to bellcrank 116, which shifts rod 107 right or left, as the handlever 100 is moved toward the top or the bottom of the drawing, about 102.

At the rear of the vehicle, rod 107 is pivoted to bellcrank lever 108 mounted on the frame and attached to rod 108a pivoted to bellcrank 109 which in turn shifts rod 109a attached to shifter lever 110' fixed to shaft 110 projecting from the gearbox. Referring back to Figures 1 and 2, it will be seen that fork 95 moved by shaft 110 and lever 110' may connect the drive for forward or reverse, yielding neutral or no-drive in mid-position.

The vehicle battery B, in addition to being directly connected to the master control of governor G, is in Figure 9 shown connected through wire 194 to push button switch S³ mounted in the ball 108a of gearshift lever 100. The spring 195 normally separates contact 196 from contact 197 so that the battery current may not flow to conductor 199 leading to the solenoid 175. Figure 10 shows the detail of construction of the gear lever ball switch.

When the button 198 is pressed, the battery circuit is applied by the connection of contacts 196 and 197, so that the operator may at any time connect the current to the solenoid 175 shifting the valve V to servo position, filling cylinders 125 and 130. This will overcome spring 149 of cylinder 125 to load clutch C for disengagement, and allow spring 74 of rod 71 to load clutch D for engagement; so that the resumption of drive after the button 198 is released may occur with the torque converter clutch engaged, with the clutch D in balking position, only with button 198 down.

This momentary admission of air pressure serves to relieve the inertia and drag of the fluid converter unit from the drive, and facilitate the shift between forward, neutral and reverse with slider 25 of Figure 2. The method of manual control for facilitating shift is believed novel and useful in the handling of high inertias.

It is believed proper to sum up the manifold advantages of my construction wherewith the statements made in the introductory portion of this specification have been substantiated by the description. In the description of operation, the foregoing specification has pointed out the method of control giving complete mastery to the driver for all normal forward drive operation through the accelerator pedal coaction with the coordinating means involving the action of the circuits established through switches S¹, S², solenoid 155 and electro-pneumatic valve control 175.

The lost motion connection between rods 152 and 154 of the throttle linkage serves the useful purposes of allowing the intervening means connected through solenoid 155 to retard the throttle and move it to engine idling position, while the ratio changing means is performing predetermined shifts through the actuating afforded by the fluid pressure servo motor devices, the interrelationships of the clutch loading and biasing means serving to accelerate the time interval of shift or hasten the interval of rejection of mesh of the jaw clutch devices, among other objects.

The overcoming control made active through stop 165 in the path of rod 152 of the throttle linkage and associated manually operated devices provides prompt response from the shifter mechanism through the power means control, and the auxiliary gear lever button switch 198 is likewise of great utility in the expediting of the responses which augment the safety and sureness of the controls in general. The applicability of this control system to the broad problem of mastery of the peculiar combination drive involved in the fluid torque converter used herein as a hydraulic drive unit yielding pure multiplied torque for reduction drive, is believed well demonstrated.

In ordinary controls for infinitely variable transmission it has been customary for inventors to devote their effort at automatic shifting to devising variable ratio interlock control means. This is well demonstrated in the prior art. The present invention, however, provides a control which takes into account the self-regulating ratio characteristic of the modern fluid torque converter, and which masters the intervals of shift between the torque converter path and the direct driving path of torque. The efficiency and speed of action of such a required control are important factors in large vehicles such as busses, wherein the sureness and safety of the control means given the operator are believed of high order in the present demonstration.

Attention is directed to the fact that the described automatic controls for forward driving in the present demonstration provide equally for reverse drive, since the elements of the control system at large, continue to function in the described manner when the drive between shafts 2 and 9 passes through the reverse idler gear 32 and countershaft gear 27. It is possible with the described controls to install the invention in a specialized type of vehicle capable of continued drive in either forward or reverse directions, as is required in the field of farm machinery and soil handling equipment, as will be obvious to one skilled in this art. The example given herewith applied to a rear-engined bus is to comply with the requirements for adequacy of showing, and in no way limits the scope or utility of the invention.

Now having described the invention and a preferred embodiment thereof, it will be understood that the scope of the same is not to be limited to the specific details herewith described, but must be understood in the light of the claims which follow.

I claim:

1. In combination, an engine connected to a power shaft, a load shaft, an accelerator pedal controlling the speed of said engine, a variable speed transmission comprising a fluid torque converter adapted to transmit drive between the shafts, clutching means for connecting said transmission to drive therebetween, further clutching means for connecting said shafts directly when said first named means is disconnected, fluid servo motor devices for operating both said means, control mechanism including a speed responsive governor for selecting the operation of said devices upon said means, and means operable upon predetermined motion of said pedal whereby said mechanism is caused to change the drive from the second to the first of said means.

2. In combination, an engine, an accelerator pedal controlling the speed of said engine, a throttle linkage moved by said pedal, a power shaft and a load shaft, a variable speed transmission connecting said shafts embodying a clutch arranged to transmit drive directly between shafts at one-to-one ratio, a shifting mechanism for said clutch, a solenoid adapted to move said linkage to engine idling position when energised, and a switch controling the circuit of said solenoid made operative by said shifting mechanism upon predetermined movement of said clutch.

3. In combination, an engine, an engine accelerator, a power shaft, a load shaft, a variable speed transmission embodying alternately operable clutches for direct drive and for reduction drive between said shafts, a shifting mechanism for operating the clutches of said variable speed transmission, a governor controlling said shifting mechanism, and a member arranged in the path of movement of the accelerator adapted to set aside the action of said governor at beyond full throttle position, and thereby release drive from said first named clutch, and cause said shifting mechanism to establish reduction drive between said shafts.

4. In motor vehicle controls, in combination, an engine, an engine throttle, a pedal, a throttle control linkage between said throttle and said pedal including a lost motion connection, a spring normally effective to eliminate the lost motion of said connection, a variable speed transmission driven by said engine, shifter means for said transmission, power means adapted to shift said throttle to engine idling position against the manual effort applied to said pedal by overcoming said spring while establishing lost motion through said connection, a control for said power means, and connecting means between said shifter means and said power means control effective to reduce the engine throttle for predetermined operating conditions of said shifter means.

5. In motor vehicles, in combination, a variable speed changing transmission embodying at least one positive-jaw driving clutch, ratio shift mechanism for said transmission and operative to connect and disconnect said clutch, controls for said mechanism, an engine throttle, means controlling said throttle and controlled by said ratio shift controls for moving the throttle to low speed position when the said controls are set and effective for releasing the drive of said clutch, and means associated with the said mechanism and said first named means effective to restore normal throttle operation upon completion of release of the said clutch.

6. In motor vehicles, in combination, an engine, an engine throttle, a manually operable device for controlling said throttle, a power shaft, a load shaft, a fluid torque converter adapted to transmit power between said shafts, shifter mechanism for establishing drive through said converter or directly between said shafts, and means governed by the movement of said mechanism for preventing manual actuation of said device for predetermined conditions of operation of said mechanism.

7. In motor vehicle power controls, a power shaft, a load shaft, a variable speed transmission coupling said shafts, shifting means in said transmission for establishing forward or reverse drive or neutral, a shifter control for said means, ratio changing means in said transmission operated by fluid pressure, a valve for controlling the fluid pressure to said means, a positive jaw clutch included in said ratio changing means, and an auxiliary manual control for said valve effective to energise the fluid pressure motor means when said shifter control is moved to shift said shifting means, the action of said manual control assisting in the completion of the shift to either neutral or reverse by said shifter control.

8. In motor vehicles, in combination, a throttle controlled engine, an accelerator pedal, a throttle lever, a return spring for said lever, a throttle rod pivoted to move said lever for varying the speed of said engine, a throttle controlling electrical circuit, energising control means for said circuit made operative by movement of said pedal, a solenoid for shifting said throttle lever against said spring to engine idling position when said circuit is electrically energised, and a yielding lost-motion connection between said pedal and said rod, said connection yielding upon energisation of said circuit by said pedal with corresponding response of said solenoid in shifting said lever to idling position.

9. In motor vehicles, in combination, an engine, an engine throttle, an engine accelerator pedal, a power shaft, a load shaft, variable speed mechanism connecting the shafts embodying positive direct drive establishing means and a second path of increased torque through a hydraulic torque converter made effective by a second engageable and disengageable driving means, actuating means for both said driving means controlled jointly by a speed governor deriving rotation from one of the shafts and said pedal, and coordinating means for said controls connected to said first named means effective to assist in the connection and release of said direct drive for predetermined shifts of said actuating means made according to the control actions of said pedal and said governor.

10. In motor vehicles, in combination, an engine, an engine accelerator pedal, a power shaft, a load shaft, a variable speed transmission connecting said shafts, fluid pressure motor means for changing the drive of said transmission between reduction ratios and direct drive, a control mechanism for said means, a governor for said mechanism effective at a predetermined speed of one of said shafts to initiate shift of the fluid pressure motor means for changing from variable reduction to direct drive of said transmission, and connecting means joining said mechanism and said pedal effective when said pedal is moved to a predetermined position to initiate a shift of said first named means from direct drive to variable reduction ratio drive by said transmission.

11. In combination, a motor vehicle driven by a throttle controlled engine, an accelerator pedal, a power shaft and a load shaft, a variable speed ratio device embodying direct drive and reduction ratio drive, shifting means for transmitting power between said shafts, control mechanism for said device comprising means responsive to said pedal position and said vehicle speed, effective to select direct drive or reduction drive by said device, and a throttle retarding means operated by said mechanism for predetermined shifts by said first named drive shifting means in response to movement of said mechanism.

12. In variable speed gearing controls for motor vehicles, in combination, an engine, an engine throttle, manual means for operating said throttle, intervening means adapted to close said throttle against the action of said manual means, a variable speed transmission driven by said engine embodying a positive jaw clutch device composed of a sliding jaw and a relatively fixed mating jaw, a friction balking member for said sliding jaw adapted to prevent mesh of said jaws except at synchronism, loading means for said member operative to establish constant friction between the member and the said fixed jaw, a slider for said sliding jaw, an operating device for said slider embodying a preloaded force applying mechanism, and connecting means between said device and said throttle intervening means effective to close said throttle for predetermined movements of said operating device.

13. In motor vehicle controls, a combination, an engine, a power shaft, a load shaft, an engine throttle, a manual control for said throttle, a solenoid arranged to shift said throttle to idling position when energised, by electric current, a variable speed transmission controlled by upshift and downshift electrical circuits operating clutch control mechanism and including fluid pressure actuation cylinders for said mechanism, a governor driven by said load shaft having electrical contacts adapted to close the upshift or a downshift controlling circuits, a solenoid valve normally arranged to prevent fluid pressure from being exerted in said cylinders, connections between said governor contacts and said valve whereby said valve is opened to apply pressure to said cylinders when the upshift circuit is closed, and a control for said throttle operating solenoid worked by the actuation of said clutch control mechanism for predetermined movements of said governor and of said manual control.

14. In power controls, in combination, an engine throttle, a variable speed transmission embodying a jaw clutch, a slider control mechanism normally biased to load said clutch for engagement, a lever arranged to interfere with the biasing action of said mechanism, fluid pressure means for rocking said lever to non-interfering position with respect to said mechanism, and means operated by motion of said mechanism for retarding the engine throttle when the fluid pressure means is rendered inactive.

15. In motor vehicles, in combination, a load shaft, a primary power shaft, a secondary power shaft, transmission means associated with said shafts embodying a train of driving elements including a pair of alternately operated clutches, one of said clutches comprising two positive jaw members carried respectively on said two first named shafts, said train also including a friction clutch adapted to connect said load shaft and said secondary power shaft, an auxiliary device arranged to permit and prevent mesh of said first named clutch members according to synchronous speeds of the two first named shafts, power means effective to alternate operation of said two clutches, a control for said power means, controlling means for said control, and connecting means between the control means for said control and said device effective when said control is moved to predetermined positions to accelerate the time interval required by said device to permit completion of mesh by said first named clutch members.

16. In motor vehicle power controls, an engine, an engine throttle, an engine shaft, a load shaft, a positive jaw clutch coupling said shafts embodying an element adapted to permit or prevent mesh of said clutch, actuation means for said clutch, a governor operating at the speed of one of the shafts arranged to control the said actuation means, and connecting means between said throttle and said actuation means operative to close said throttle to idling position for predetermined control movement of said governor applied to said actuation means for said clutch, whereby the interval of rejection of mesh of said clutch by said element is shortened when said clutch is being loaded for engagement by said means.

17. In power controls, in combination, a motor vehicle, an engine, an accelerator pedal for said engine, a first shaft connected directly to said engine, a second shaft connected directly to the vehicle load, mating positive clutch jaws adapted to couple said shafts, a constantly loaded friction element adapted to prevent, or to permit, mesh of said jaws in accordance with synchronous speeds of the two shafts, a control mechanism for engaging and disengaging said jaws embodying a loading means of predetermined force, an actuating means for said mechanism including a biasing means of superior force to that of said loading means and normally active to hold said loading means from being exerted on said mechanism, and a power means controlled by movement of said pedal adapted to overcome said biasing means and permit said loading means to become effective upon said control mechanism for loading said jaws for engagement whereafter in the sequence of operation said friction element permits said jaws to engage at synchronous speed.

18. In power controls, in combination, an engine, an engine throttle, an engine throttle control, a power shaft carrying a movable positive clutch element, a load shaft carrying a mating clutch element, a constantly loaded friction element adapted to permit engagement of said first two elements at synchronous speeds of the shafts, shifting means controlling the engagement of said elements, coordinating means effective to cause the shifting means to move toward engagement of the said first two named elements while moving the engine throttle to engine idling position, and further means operative upon synchronous speed completion of mesh of said first named element with said second named element to disconnect the said coordinating means from further effect upon said engine throttle.

19. In motor vehicle controls, an engine, an engine-speed controlling pedal, a variable speed transmission including a direct driving clutch and a clutch for establishing variable ratio reduction speeds through a hydraulic unit, control mechanism for said clutches, a governor normally arranged to select the action of said mechanism for establishing drive through the hydraulic unit at low speeds or direct drive at high speed ranges, and an overcoming control worked by said pedal and operative on said mechanism adapted to set aside the high speed direct drive action of said governor, and compel variable reduction ratio drive through said hydraulic unit at the will of the operator.

20. In motor vehicles, in combination, an engine and a throttle therefor, control means for said throttle, a power shaft driven by said engine, a load shaft, a variable speed ratio drive embodying one path of torque between said shafts for driving said load shaft at variable reduction ratios, and embodying a second path of torque in which a positive jaw clutch couples said shafts directly, controls effective to establish said paths of torque alternately for reduction drive or for direct drive including a mechanism for shifting said clutch to driving and non-driving position, and means moved by said mechanism preloaded for release of said clutch and simultaneously operative upon said throttle control means to reduce the setting of said engine throttle toward idling position, thereby relieving the torque on the teeth of said jaw clutch for diminishing the force requirement for shifting said mechanism.

21. In motor vehicles, in combination, an engine-connected power shaft, a load shaft, a variable speed transmission coupling said shafts embodying a releasable jaw clutch for establishing drive at one speed ratio between said shafts, a shifter mechanism for said clutch, ratio selection means controlling said transmission and said clutch, interlocking means connected to said means, said mechanism and said throttle effective to reduce the speed of said engine connected shaft when said mechanism is being shifted to engage said clutch in accordance with the action of said ratio selection means, and likewise effective to reduce the engine torque applied to said clutch by said engine connected shaft when said mechanism is being shifted to disengage said clutch in accordance with the action of said ratio selection means.

22. A device as claimed in claim 21 wherein the clutch is composed of driving and driven members and an intermediate friction-responsive member adapted to prevent mesh of said members at dissimilar speeds, and permit mesh thereof at synchronous speeds.

23. A device as claimed in claim 21 wherein the shifter mechanism transmits force for shifting said clutch through a resilient means.

24. A device as claimed in claim 21 wherein the ratio selection means is connected to the said shifter mechanism through the agency of a relay controlled by said means, said relay directing the application of auxiliary power to the said shifter mechanism.

25. A device as claimed in claim 21 wherein the said shifter mechanism is actuated by auxiliary power means.

26. In motor vehicles, in combination, an engine, a throttle control for said engine, a change speed transmission for coupling said engine to a load shaft, embodying a jaw clutch arranged to take the driving torque on radial toothed faces, shifter means for said clutch, shift control mechanism for said means adapted to load said means for engagement and release of the drive by the said clutch, and means interconnecting said mechanism with said throttle control effective to reduce the speed of said engine and thereby reduce the driving torque on said toothed faces of said clutch in advance of said shifter means being loaded by said mechanism for release of the said drive by the said clutch.

27. A combination according to claim 4, characterized by means associated with said shifter means and said power means control effective to set aside the action of said connecting means upon completion of said predetermined operating conditions of said shifter means.

28. In a combination such as described in claim 11, the further combination of a throttle for said engine and means associated with said control mechanism adapted to restore normal operation of said throttle after said predetermined shifts by said first named drive shifting means shall have been made in response to movement of said control mechanism.

29. In a combination such as provided in claim 12, the sub-combination therewith of means associated with said device and said control means adapted to render the said throttle intervening means ineffective when said predetermined movements of said operating device are completed.

30. A combination such as described in claim 14, further including means associated with said mechanism and said retarding means effective to render said retarding means ineffective for predetermined movement of said mechanism.

31. A drive control arrangement as characterized in claim 16 including means controlled by said actuation means during disengagement of said clutch effective to retard the said throttle upon the initial clutch disengagement action thereof and to restore normal operation of said throttle after the clutch disengagement action is completed.

32. In power control devices for motor vehicles, an engine, a load shaft, a transmission mechanism adapted to provide a direct drive between said engine and said load shaft and adapted to provide indirect drive therebetween when said direct drive is disconnected, said mechanism embodying positive driving elements arranged to couple said engine and load shaft and tending to resist disengagement thereof when drive is being transmitted between said engine and said shaft by said elements, shifter means arranged to apply force to one of said elements for causing engagement and disengagement of said elements for changing the ratio of drive between said engine and said load shaft, a device adapted to diminish the torque of said engine and thereby unload the resistance to disengagement of said elements for facilitating release of drive thereof, and means controlling the disengagement action of said shifter means effective to cause said device to diminish the said torque of said engine prior to release of drive by said elements.

33. In variable speed ratio transmissions for motor vehicle drive, in combination, an engine, a power shaft driven by said engine, a load shaft, a transmission mechanism coupling said shafts at various speed ratios including a positive jaw clutch for coupling them at direct driving ratio, a balking member associated with said clutch adapted to prevent engagement of said clutch except when synchronism between said shafts exists, actuating means for said clutch arranged to apply engaging and disengaging force thereto for coupling and uncoupling the drive between said shafts, a device operative with actuation of said means and effective to diminish the torque of said engine and thereby unload the resistance to disengagement of the jaw elements of said positive jaw clutch when said means is set to disengage said clutch, and control means acting upon said device and said actuating means arranged to select speed ratio of said mechanism and actuation of said clutch by said actuation means for both engagement and disengagement.

34. In variable speed ratio transmissions for motor vehicle drive, an engine, an engine throttle, a power shaft driven by said engine, a transmission mechanism driven by said power shaft, a load shaft adapted to be driven by said mechanism, engageable and disengageable positive coupling means for said shafts embodied in said mechanism, control means for said coupling means and said mechanism, a speed responsive device operable upon said control means for selecting the drive of said mechanism and for causing engagement and disengagement of said coupling means, a pedal for said throttle connected to modify the operation of said device upon said control means, and additional means for reducing and then restoring the torque of said engine to facilitate the release of said coupling means when said control means is operating to disconnect said coupling means under the joint action of said device and said pedal.

35. In variable speed ratio transmissions for motor vehicle drive, an engine, an engine throttle, a power shaft driven by said engine, a transmission mechanism driven by said power shaft, a load shaft adapted to be driven by said mechanism, engageable and disengageable positive coupling means for said shafts embodied in said mechanism, control means for said coupling means and said mechanism, a speed responsive device operable upon said control means for selecting the drive of said mechanism and for causing engagement and disengagement of said coupling means, a pedal for said throttle connected to modify the operation of said device upon said control means, and additional means for reducing and then restoring the torque of said engine to facilitate the release of said coupling means when said control means is operating to disconnect said coupling means under the joint action of said device and said pedal, said additional means being likewise effective to reduce the torque of said engine upon the initiation of engagement of said coupling means and to restore same when said engagement is completed.

HANS O. SCHJOLIN.